(12) United States Patent
Bader et al.

(10) Patent No.: US 12,499,688 B2
(45) Date of Patent: Dec. 16, 2025

(54) VELOCITY ESTIMATION IN REMOTELY SENSED IMAGERY

(71) Applicant: VANTOR INC., Westminster, CO (US)

(72) Inventors: Brett W. Bader, Lyons, CO (US); Michael Aschenbeck, Westminster, CO (US); Charles W. Danforth, Louisville, CO (US); David Kettler, Thornton, CO (US); Wolfgang Schickler, Golden, CO (US)

(73) Assignee: Vantor Inc., Westminster, CO (US)

( * ) Notice: Subject to any disclaimer, the term of this patent is extended or adjusted under 35 U.S.C. 154(b) by 440 days.

(21) Appl. No.: 17/744,081

(22) Filed: May 13, 2022

(65) Prior Publication Data

US 2023/0368540 A1 Nov. 16, 2023

(51) Int. Cl.
| | |
|---|---|
| *G06K 9/00* | (2022.01) |
| *G06T 7/246* | (2017.01) |
| *G06T 7/30* | (2017.01) |
| *G06T 7/73* | (2017.01) |
| *G06V 20/58* | (2022.01) |
| *H04N 23/68* | (2023.01) |

(52) U.S. Cl.
CPC .............. *G06V 20/58* (2022.01); *G06T 7/246* (2017.01); *G06T 7/30* (2017.01); *G06T 7/73* (2017.01); *H04N 23/6812* (2023.01); *G06T 2207/10016* (2013.01); *G06T 2207/20081* (2013.01); *G06T 2207/30236* (2013.01)

(58) Field of Classification Search
CPC .. G06T 2207/10032; G06T 7/70; G06V 20/13
See application file for complete search history.

(56) References Cited

U.S. PATENT DOCUMENTS

| | | | |
|---|---|---|---|
| 2016/0188953 A1* | 6/2016 | Tabb | G06F 16/583 |
| | | | 382/103 |
| 2018/0286052 A1* | 10/2018 | Mcardle | G06T 7/20 |

(Continued)

FOREIGN PATENT DOCUMENTS

| | | | | |
|---|---|---|---|---|
| WO | WO-2017195858 A1 * | 11/2017 | | H04N 5/232 |
| WO | WO2021/097185 A1 | 5/2021 | | |

OTHER PUBLICATIONS

Tang, Jiexiong, et al. "Compressed-domain ship detection on spaceborne optical image using deep neural network and extreme learning machine." IEEE transactions on geoscience and remote sensing 53.3 (2014): 1174-1185. (Year: 2014).*

(Continued)

*Primary Examiner* — Gregory A Morse
*Assistant Examiner* — Owais Iqbal Memon
(74) *Attorney, Agent, or Firm* — Harness, Dickey & Pierce, P.L.C.

(57) ABSTRACT

A method is provided for estimating velocity of a moving object. The method includes generating a raw velocity for the moving object from a position change between a first image generated by a first sensor and a second image generated by a second sensor of a sensor assembly and selecting a plurality of stationary background features that are captured with the moving object in one or more images. A background misregistration value is generated from apparent movement of the plurality of stationary background features and is used to correct the raw velocity.

17 Claims, 15 Drawing Sheets

(56) References Cited

U.S. PATENT DOCUMENTS

| | | | |
|---|---|---|---|
| 2020/0184657 A1* | 6/2020 | Gong | G06T 7/292 |
| 2021/0150206 A1 | 5/2021 | Bader | |
| 2022/0101551 A1* | 3/2022 | Eberspach | G06T 7/70 |

OTHER PUBLICATIONS

Heiselberg, Henning. "Aircraft and ship velocity determination in Sentinel-2 multispectral images." Sensors 19.13 (2019): 2873. (Year: 2019).*

Salehi, Bahram, et al., "Automatic Moving Vehicles Information Extraction From Single-Pass WorldView-2 Imagery," IEEE Journal of Selected Topics in Applied Earth Observations and Remote Sensing, vol. 5, No. 1, Feb. 1, 2012, 12 pages.

Gao, Feng, et al., "Moving Vehicle Information Extraction from Single-Pass WorldView-2 Imagery Based on ERGAS-SNS Analysis," Remote Sens., ISSN 2072-4292, 24 pages.

* cited by examiner

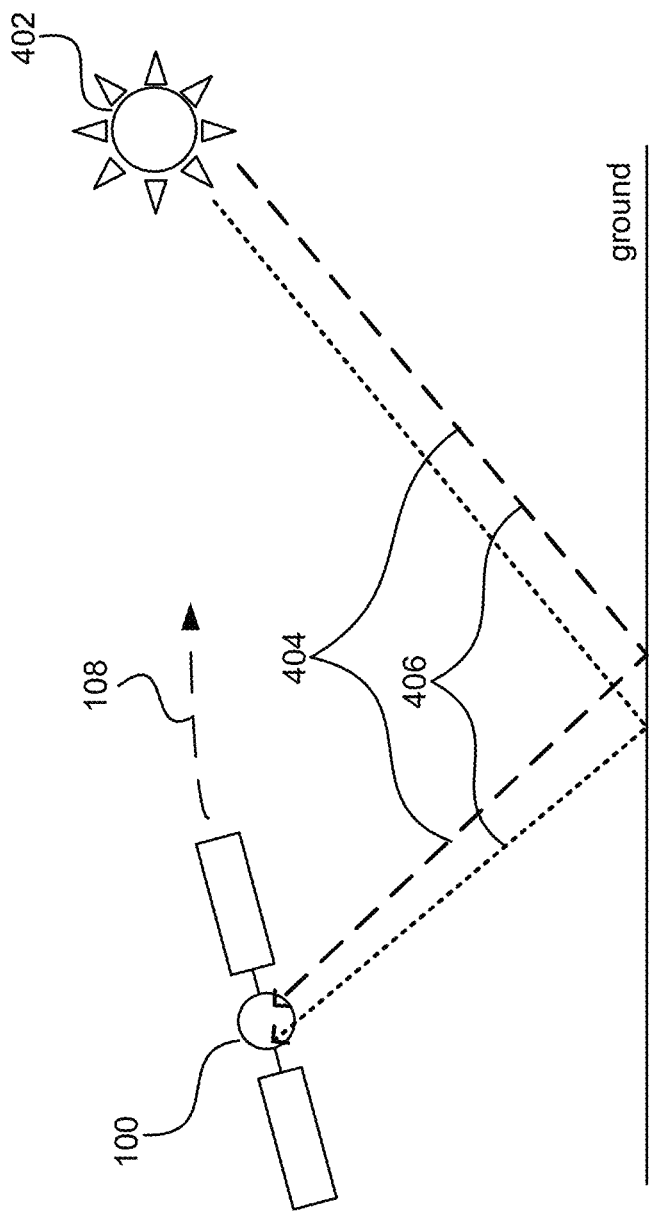

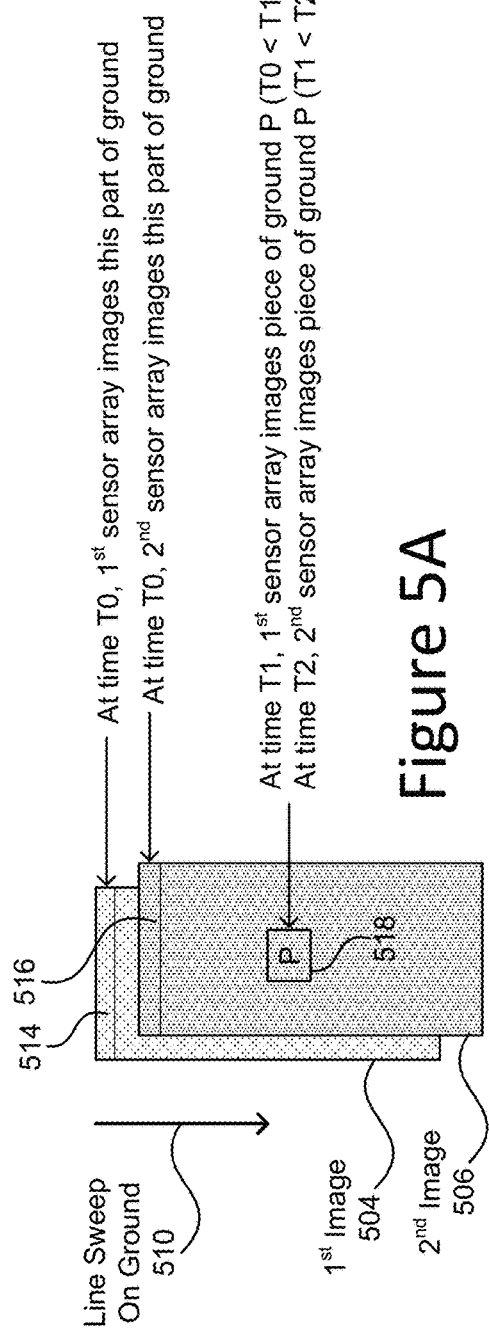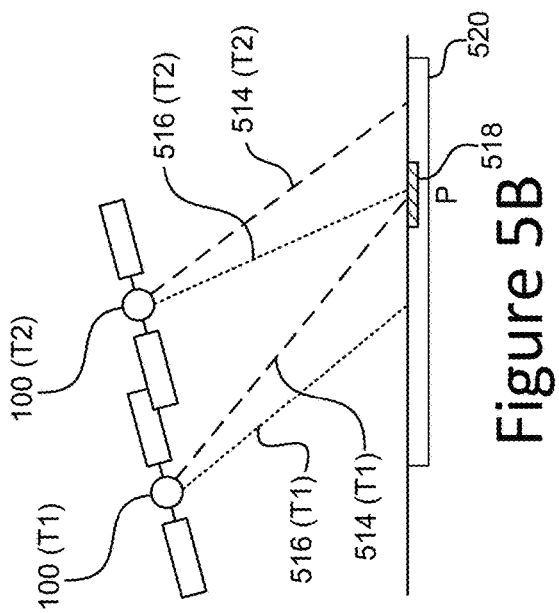

VELOCITY ESTIMATION IN REMOTELY SENSED IMAGERY

BACKGROUND

The present document relates to satellite technology, including geospatial imagery technology.

The use of geospatial imagery (e.g., satellite imagery) continues to increase over time. High quality geospatial imagery has become increasingly valuable. For example, a variety of different entities (e.g., government entities, corporations, universities, individuals, or others) may utilize satellite imagery. The use of such satellite imagery may vary widely such that satellite images may be used for a variety of differing purposes.

Many entities utilize geospatial imagery in order to learn about activities on Earth. For example, an entity may want to know about the locations and movements of objects such as cars or other on-road or off-road vehicles (including military vehicles), trains, ships, boats, aircraft and/or other moving or potentially moving objects. However, due to the large number of images available and the large amount of data, it is often not practical for a human to manually review geospatial imagery. Therefore, systems have been developed to obtain information from geospatial imagery.

BRIEF DESCRIPTION OF THE DRAWINGS

FIG. 4 depicts operation of a satellite with two sensors.

FIG. 5A depicts two bands of a composite image captured by a satellite (or other airborne craft) that is part of an image collection and distribution system that can implement various embodiments of the proposed technology.

FIG. 5B shows a satellite at two positions in orbit above Earth.

DETAILED DESCRIPTION

Technology is proposed for estimating velocity from remotely sensed imagery (e.g., image data from a satellite). The velocity of a moving object may be inferred (moving target inference, or MTI, also referred to as Moving Object Inference, or MOI) from the different location of a moving object in images obtained from different sensors (e.g., different sensor chips in a sensor assembly, which may also be referred to as a "focal plane assembly"). In some cases, misregistration may occur between images from such sensors (e.g., images from different spectral bands), which may cause errors in estimated velocity. According to examples described below, misregistration at one or more locations near a moving object may be used to provide a background misregistration value that can be subtracted from a raw velocity to obtain a corrected velocity. Where nearby misregistration values are affected by factors such as sensor assembly effects, terrestrial features, or other effects, locations used may be selected to reduce the impact of such effects. Objects (including moving objects) may be identified using a machine learning model, e.g., one or more application trained by machine learning (e.g., to identify cars, trains, ships, military vehicles, aircraft, or other objects). When an object is detected in one image, a nearby portion of a corresponding image from another sensor chip may be searched for a match. A match location may be found with sub-pixel accuracy to provide an accurate displacement and accurate velocity.

Figure 1:
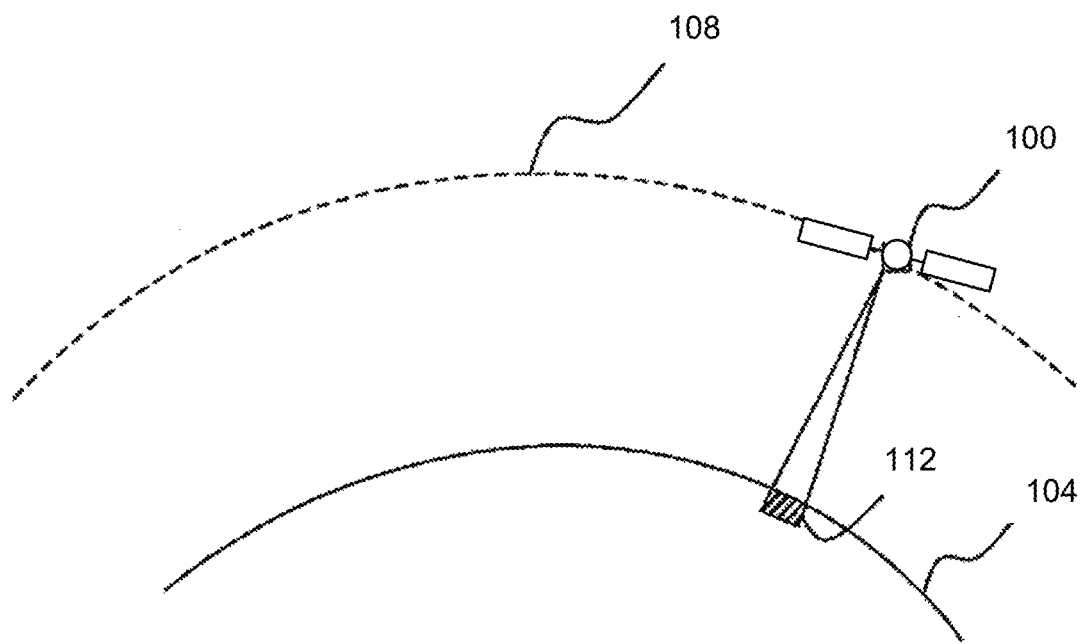
FIG. 1 illustrates how a satellite orbiting a planet can be used to obtain images of Earth. This satellite can be used as part of an image collection and distribution system that can implement various embodiments of the proposed technology.

FIG. 1 depicts a satellite 100 orbiting a planet 104 (e.g., Earth, another planet or another object). Satellite 100 can be used to capture the images analyzed using the technology proposed herein. At the outset, it is noted that, when referring to Earth herein, reference is made to any body or object of which it may be desirable to acquire images or other remote sensing information. Furthermore, when referring to a satellite herein, reference is made to any spacecraft, satellite, aircraft and/or other airborne craft capable of acquiring images. Furthermore, the system described herein may also be applied to other imaging systems, including imaging systems located on Earth or in space that acquire images of other celestial bodies or objects. It is also noted that none of the drawing figures contained herein are drawn to scale, and that such figures are for the purposes of discussion and illustration only.

As illustrated in FIG. 1, satellite 100 orbits Earth 104 following an orbital path 108. An imaging system aboard the satellite 100 is capable of acquiring an image of a portion 112 of the surface of Earth 104, which portion 112 can also be referred to as a geographic region (or region). An image that is obtained by the satellite 100 includes a plurality of pixels. Furthermore, the satellite 100 may collect images in a number of spectral bands. In certain embodiments, the imaging system aboard the satellite 100 collects multiple bands of electromagnetic energy, wherein each band is collected by a separate image sensor element that is adapted to collect electromagnetic radiation within a corresponding spectral range. More specifically, an image obtained by the imaging system aboard the satellite 100 can be a multispectral image (MSI) where image data is captured at specific wavelength bands across the electromagnetic spectrum. That is, one or more image sensors (e.g., provided on a satellite imaging system) may have a plurality of specifically designed sensor elements capable of detecting light within a predetermined range of wavelengths.

For a specific example, the WorldView-2 low Earth orbiting satellite, collects image data in nine visible and near infrared (VNIR) spectral bands, including, a coastal (C) band (400-450 nm), a blue (B) band (450-510 nm), a green (G) band (510-580 nm), a yellow (Y) band (585-625 nm), a red (R) band (630-690 nm), a red edge (RE) band (705-745 nm), a near-infrared 1 (N1) band (770-895 nm), and a near-infrared 2 (N2) band (860-1040 nm).

In some embodiments, band definitions broader and/or narrower than those described above may be provided without limitation. In any regard, there may be a plurality of band values corresponding to gray level values for each band for each given pixel in a portion of multispectral image data. There may also be a panchromatic (PAN) sensor capable of detecting imagery in the wavelength band of 450-800 nm (also referred to as the panchromatic band). Further, the image data obtained by a satellite imaging system may include metadata that includes supplementary data regarding the acquisition of the image. For instance, image metadata that may accompany and/or form a portion of the image data may include satellite parameters (e.g., off nadir satellite angles, satellite attitudes, solar elevation angles, etc.), time/date of acquisition, and/or other appropriate parameters.

Figure 2:
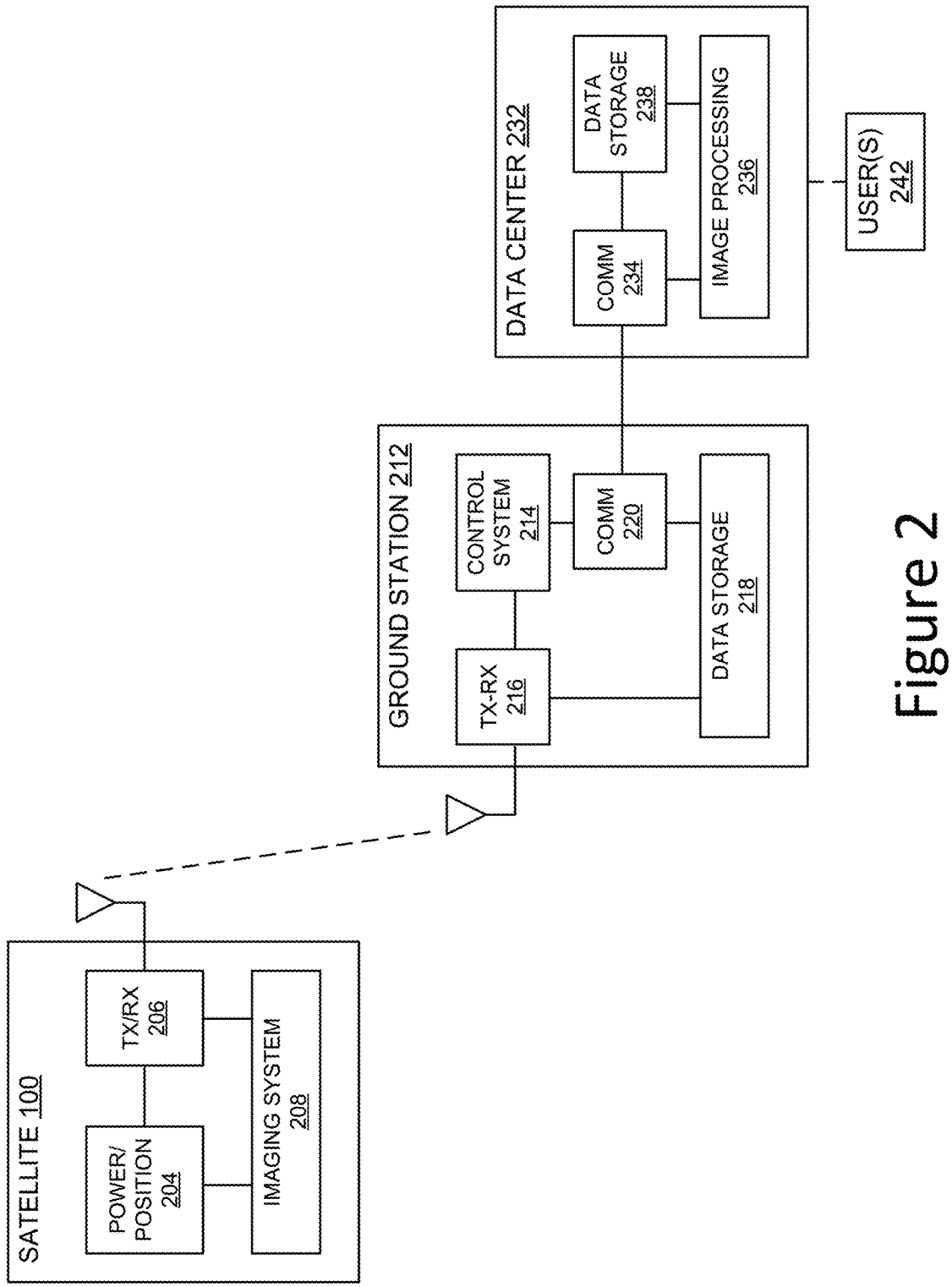
FIG. 2 is a high-level block diagram of an image collection and distribution system that can implement various embodiments of the proposed technology.

Referring now to FIG. 2, a block diagram representation of an image collection and distribution system 200 is shown therein. In this embodiment, the satellite 100 includes a number of subsystems, including power/positioning subsystem 204, a transmit/receive subsystem 206, and an imaging subsystem 208. Each of the aforementioned subsystems can also be referred to more succinctly as a system, e.g., the imaging subsystem 208 can also be referred to as the imaging system 208. The power/positioning subsystem 204 receives power and can be used to position that satellite 100 and/or the imaging system 208 to collect desired images, as is well known in the art. The TX/RX subsystem 206 can be used to transmit and receive data to/from a ground location and/or other satellite systems, as is well known in the art. The imaging system 208, in certain embodiments, includes one or more multispectral (MS) sensor arrays that collect electromagnetic energy within multiple (e.g., 4, 8, or 16) bands of electromagnetic energy, wherein a band of electromagnetic energy can also be referred to as a range of frequencies. In other words, each of the sensors collects electromagnetic energy falling within a respective preset band that is received at the sensor. Examples of such bands were discussed above. The imaging sensors, which can also be referred to as image sensors, can include charge coupled device (CCD) arrays and associated optics to collect electromagnetic energy and focus the energy at the CCD arrays. The CCD arrays can be configured to collect energy from a specific energy band by a mass of optical filters. The sensors can also include electronics to sample the CCD arrays and output a digital number (DN) that is proportional to the amount of energy collected at the CCD array. Each CCD array includes a number of pixels, and in accordance with certain embodiments, the imaging system operates as a push broom imaging system. Thus, a plurality of DNs for each pixel can be output from the imaging system to the transmit/receive subsystem 206. The use of other types of sensors, besides a CCD array, is also possible and within the scope of the embodiments described herein. For a nonlimiting example, an alternative type of sensor that can be used in place of CCD type sensors is complementary metal-oxide-semiconductor (CMOS) type sensors.

The satellite 100 transmits to and receives data from a ground station 212. In one embodiment, ground station 212 includes a transmit/receive system 216, a data storage system 218, a control system 214, and a communication system 220, each of which can also be referred to as a subsystem. While only one ground station 212 is shown in FIG. 2, it is likely that multiple ground stations 212 exist and are able to communicate with the satellite 100 throughout different portions of the satellite's orbit. The transmit/receive system 216 is used to send and receive data to and from the satellite 100. The data storage system 218 may be used to store image data collected by the imaging system 208 and sent from the satellite 100 to the ground station 212. The control system 214 can be used for satellite control and can transmit/receive control information through the transmit/receive system 216 to/from the satellite 100. The communication system 220 is used for communications between the ground station 212 and one or more data centers 232.

Data center 232 includes a communication system 234, a data storage system 238, and an image processing system 236, each of which can also be referred to as a subsystem. The image processing system 236 processes the data from the imaging system 208 and provides a digital image to one or more user(s) 242. Certain operations of the image processing system 236, according to certain embodiments of the proposed technology, will be described in greater detail below. That is, in some embodiments, the processes discussed below for determining velocity of moving objects from image data are performed by image processing system 236. Alternatively, the image data received from the satellite 100 at the ground station 212 may be sent from the ground station 212 to a user 242 directly. The image data may be processed by the user (e.g., a computer system operated by the user) using one or more techniques described herein to accommodate the user's needs.

Figure 2A:
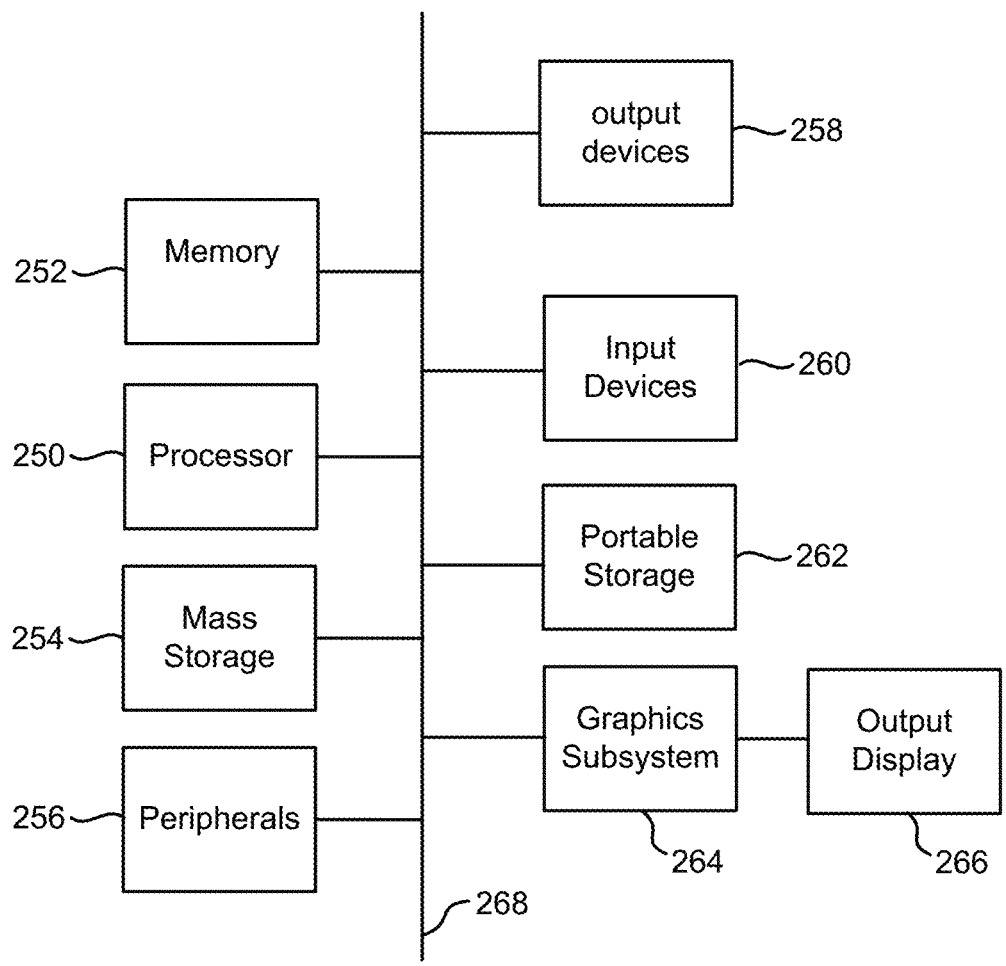
FIG. 2A depicts an example of a computing system that can perform the processes discussed herein. This computing system can be used to implement one or more of the components of an image collection and distribution system that can implement various embodiments of the proposed technology.

FIG. 2A is a block diagram of one example embodiment of a computing system that can be used to implement image processing system 236 and perform the processes discussed below for estimating velocity of moving objects from images from satellite 100. The computer system of FIG. 2A includes a processor 250 and main memory 252. Processor 250 may contain a single microprocessor or may contain a plurality of microprocessors for configuring the computer system as a multi-processor system. Main memory 252 stores, in part, instructions and data for execution by processor 250. In embodiments where the proposed technology is wholly or partially implemented in software, main memory 252 can store the executable code when in operation. Main memory 252 may include banks of dynamic random access memory (DRAM) as well as high speed cache memory.

The system of FIG. 2A further includes a mass storage device 254, peripheral device(s) 226, user input device(s) 260, output devices 258, portable storage medium drive(s) 262, a graphics subsystem 264 and an output display 266. For purposes of simplicity, the components shown in FIG. 2A are depicted as being connected via a single bus 268. However, the components may be connected through one or more data transport means. For example, processor 250 and main memory 252 may be connected via a local microprocessor bus, and the mass storage device 254, peripheral device(s) 226, portable storage medium drive(s) 262, and graphics subsystem 264 may be connected via one or more input/output (I/O) buses. Mass storage device 254, which may be implemented with a magnetic disk drive or an optical disk drive or a solid state drive, is a non-volatile storage device for storing data and instructions for use by processor 250. In one embodiment, mass storage device 254 stores the system software for implementing the proposed technology for purposes of loading to main memory 252. Mass storage device 254 may be considered an example of a non-transitory processor readable storage device having processor readable code embodied on the non-transitory processor readable storage device for programming one or more processors (e.g., processor 250) to perform one or more of the methods described below.

Portable storage medium drive 262 operates in conjunction with a portable non-volatile storage medium, such as a flash device, to input and output data and code to and from the computer system of FIG. 2A. In one embodiment, the system software for implementing the proposed technology is stored on such a portable medium, and is input to the computer system via the portable storage medium drive 262, in which case portable storage medium drive 262 may be considered an example of a non-transitory processor readable storage device having processor readable code embodied on the non-transitory processor readable storage device for programming one or more processors (e.g., processor 250) to perform one or more of the methods described below.

Peripheral device(s) 226 may include any type of computer support device, such as an input/output (I/O) interface, to add additional functionality to the computer system. For example, peripheral device(s) 226 may include a network interface for connecting the computer system to a network, a modem, a router, etc.

User input device(s) 260 provides a portion of a user interface. User input device(s) 260 may include an alpha-numeric keypad for inputting alpha-numeric and other information, or a pointing device, such as a mouse, a trackball, stylus, or cursor direction keys. In order to display textual and graphical information, the computer system of FIG. 2A includes graphics subsystem 264 and output display 266 (e.g., a monitor). Graphics subsystem 264 receives textual and graphical information and processes the information for output to display 266. Additionally, the system of FIG. 2A includes output devices 258. Examples of suitable output devices include speakers, printers, network interfaces, monitors, etc.

Figure 3A:
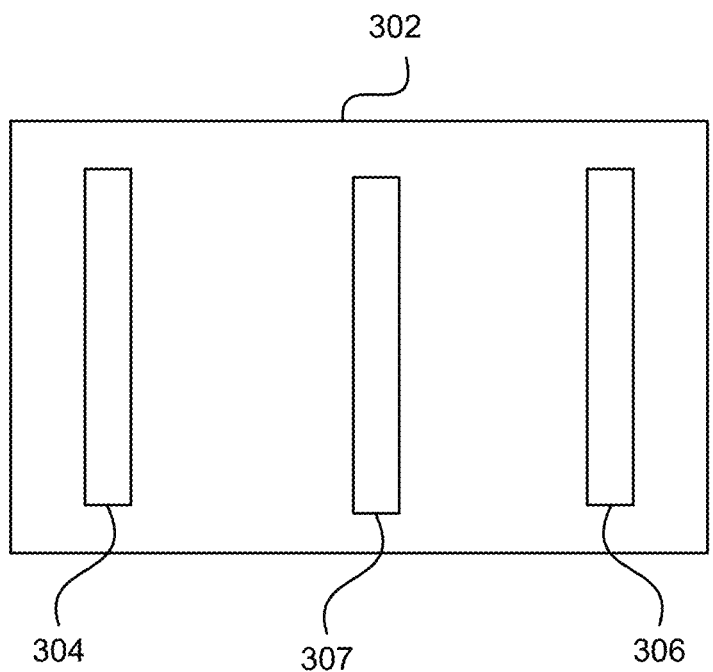
FIG. 3A-D illustrate examples of a sensor assembly.
Figure 3B:
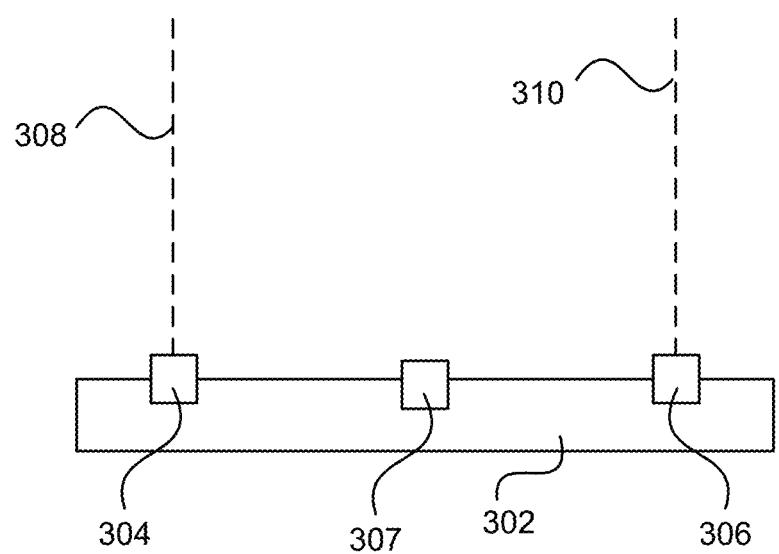

FIG. 3A illustrates an exemplary top view of a sensor assembly 302 of the imaging system 208 that can be carried by the satellite 100, and FIG. 3B illustrates an exemplary side view of the sensor assembly 302. More specifically referring to FIGS. 3A and 3B, the imaging system 208 can include first and second multispectral (MS) sensors 304 and 306, which can also be referred to as the MS1 sensor 304 and the MS2 sensor 306. Sensor assembly 302 also includes a panchromatic band sensor 307, which may also be referred to as PAN sensor 307. The MS1 sensor 304, MS2 sensor 306, and PAN sensor 307 may be considered parts of the sensor assembly 302 that is carried by the satellite 100. Each of the MS1, MS2, and PAN sensors 304, 306, 307 can include thousands of image sensor elements generally aligned in one or more rows arranged generally perpendicular to the flight direction of the satellite 100, thereby enabling images to be captured one or more rows at a time, as is done in a push broom imaging system.

In one embodiment, the MS1 sensor 304 includes one or more rows of image sensor elements that collect image data in the blue (B) band (450-510 nm), green (G) band (510-580 nm), red (R) band (630-690 nm), and near-infrared 1 (N1) band (770-895 nm); and the MS2 sensor 306 includes one or more rows of image sensor elements that collect image data in the coastal blue (C) band (400-450 nm), yellow (Y) band (585-625 nm), red edge (RE) band (705-745 nm), and near-infrared 2 (N2) band (860-1040 nm). In other words, the MS1 sensor 304 collects image data in the B, G, R, and N1 bands; and the MS2 sensor 306 collects image data in the C, Y, RE, and N2 bands. Together, the MS1, MS2, and PAN sensors 304, 306, 307 collect or capture image data in the VNIR bands.

As can be appreciated from FIGS. 3A and 3B, the MS1 sensor 304, PAN sensor 307, and MS2 sensor 306 are physically spaced apart from one another. That is, the MS1 sensor 304, the PAN sensor 307, and the MS2 sensor 306 are at different positions on the focal plane of the optics of satellite 100 and thus are receiving light from different portions of Earth at any given time. Referring to FIGS. 3A and 3B, the MS1 sensor 304 is designed together with an optical system of the satellite to receive radiant optical energy along a first primary axis 308, and the MS2 sensor 306 is designed together with the optical system of the satellite to receive radiant optical energy along a second primary axis 310. As will be appreciated from the discussion below, certain embodiments of the present technology exploit the fact that the MS1 sensor 304, the MS2 sensor 306, and the PAN sensor 307 are physically and/or angularly offset from one another.

In one embodiment, the MS1 sensor 304, MS2 sensor 306 and PAN sensor 307 are push broom sensors. There is a physical separation between MS1 sensor 304, PAN sensor 307, and MS2 sensor 306 on the focal plane of the sensor assembly 302 that includes the sensors, as can be appreciated from FIGS. 3A and 3B. The MS1 sensor 304 can be used to produce a first image of a portion of the surface of Earth (e.g., in a first frequency band), while the MS2 sensor 306 produces a second image of a portion of the surface of Earth (e.g., in a second frequency band), and the PAN sensor 307 can be used to produce a third image of a portion of Earth (e.g., in a third frequency band). Because of the physical separation between the sensors 304, 307, and 306 at the focal plane of the sensor assembly 302, the first, second, and third images (produced using the sensors 304, 306, and 307 respectively) will have slight offsets in the top, bottom, and sides of the images, as will be described in further detail with reference to FIGS. 4 and 5. Each image that is obtained by a sensor includes image data, which can include spectral data and metadata, but is not limited thereto. In another embodiment, one or more of MS1 sensor 304, MS2 sensor 306, and/or PAN sensor 307 are whisk broom sensors. In other embodiments, other types of sensors can be used (e.g., a sequential framing camera).

Figure 3C:
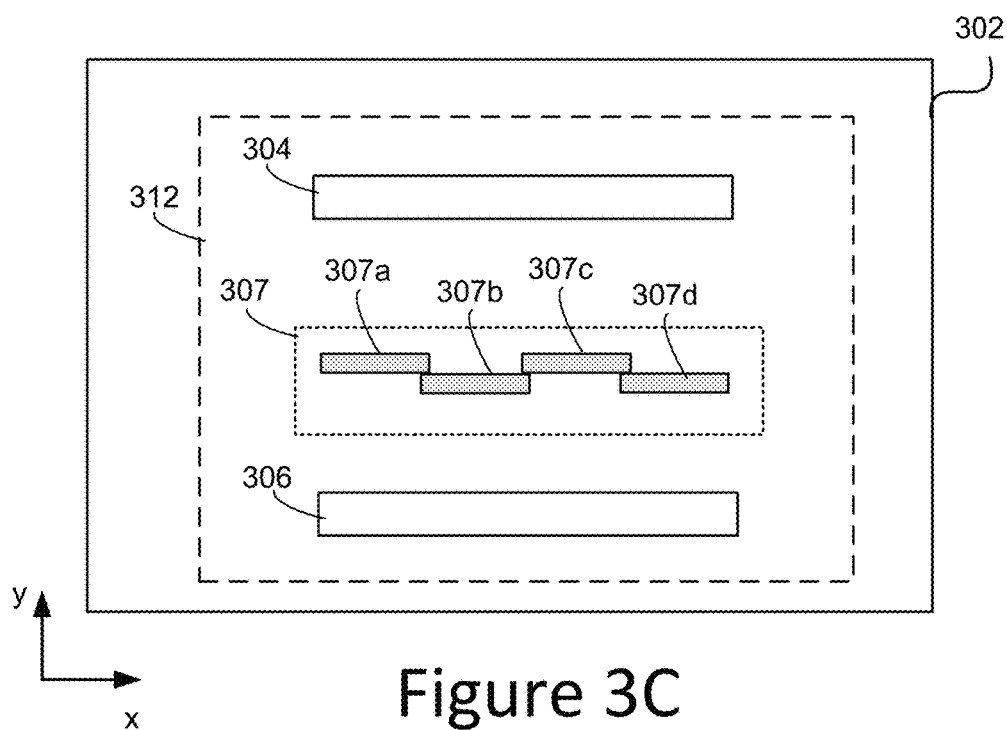

FIG. 3C shows an example implementation of sensor assembly 302, which shows PAN sensor 307 formed of multiple sensor chips 307a-307d arranged across sensor assembly 302. Sensor chips 307a-d extend along the x direction to provide high resolution and are staggered (alternate) in the y direction so that there is some overlap. This arrangement provides high resolution (e.g., four times the number of pixels as with a single sensor chip) and overlapping coverage provided by overlapping chips ensures that there are no gaps in the field of view. The arrangement of MS1 sensor 304, MS2 sensor 306, and PAN sensor 307 may be referred to as a Detector Chip Assembly (DCA). A sensor assembly (e.g., sensor assembly 302) may include one or more DCAs.

Figure 3D:
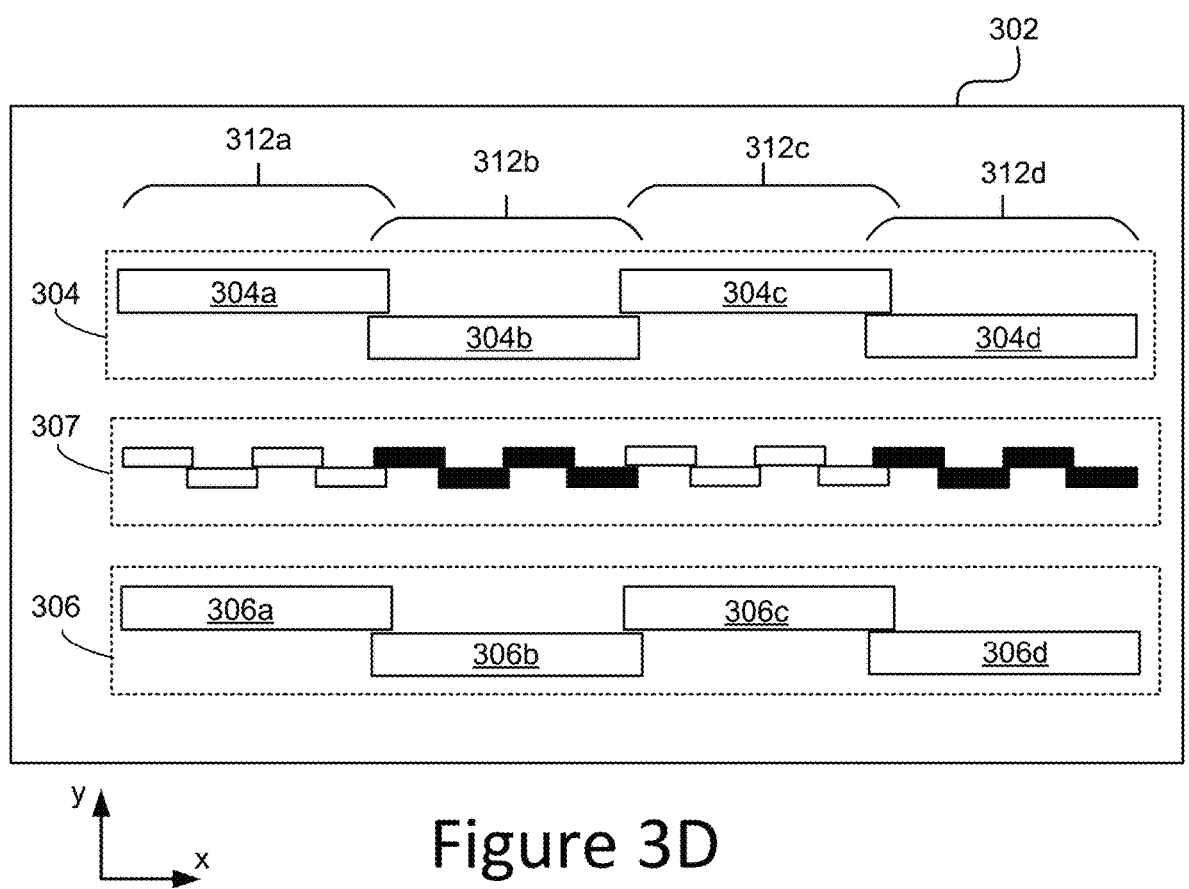

FIG. 3D shows an example implementation of sensor assembly 302, which includes four DCAs 312a-312d arranged along the x direction along the focal plane of satellite 100. DCA 312a includes MS1 sensor chip 304a, MS2 sensor chip 306a and four PAN sensor chips. DCA 312b includes MS1 sensor chip 304b, MS2 sensor chip 306b and four PAN sensor chips (shaded). DCA 312c includes MS1 sensor chip 304c, MS2 sensor chip 306c and four PAN sensor chips. DCA 312d includes MS1 sensor chip 304d, MS2 sensor chip 306d and four PAN sensor chips (shaded). In each sensor 304, 306, 307, individual sensor chips are staggered so that their fields of view overlap and there are no gaps in the combined field of view. Image data captured by different sensor chips (e.g., in different DCAs) may be aligned, smoothed, or subject to other operations to generate a composite image. In some cases, some artefacts of different sensor chips and/or different DCAs may remain after such operations.

FIG. 4 shows satellite 100 moving along the orbital path 108. FIG. 4 also shows that light emitted from the sun 402 is reflected off the surface of Earth towards the satellite 100 such that first and second images of a portion of the surface of Earth are captured by the MS1 and MS2 sensors, respectively. More specifically, the emitted and reflect light labeled 404 is imaged by the MS1 sensor 304 to produce the first image, and the emitted and reflected light labeled 406 is imaged by the MS2 sensor 306 to produce the second image. Explained another way, the MS1 sensor can be said to obtain first image data, and the MS2 sensor can be said to obtain second image data. FIG. 4 shows that at a given instant in time, the MS1 sensor array captures an image of a first location on Earth and the MS2 sensor array captures an image of a second location on Earth. Thus, for a particular location on Earth, the MS1 sensor array captures an image of the particular location on Earth at a first time and the MS2 sensor array captures an image of the same particular location on Earth at a second time that is after the first time. In other words, a single location depicted in a multispectral image from satellite 100 will have been sensed at different times by the MS1 sensor and the MS2 sensor.

FIG. 5A illustrates how first and second images 504 and 506, which are slightly offset from one another, are captured respectively by first and second sensors that are physically offset from one another on the focal plane of satellite 100. Such first and second sensors can be the MS1 sensor 304 and the MS2 sensor 306, discussed above, but are not limited thereto. The arrowed line labeled 510 in FIG. 5A represents the line sweep on the ground of the sensor arrays. Because of the physical offset of the first and second sensors, at a common time T0, the first and second sensors image different parts of the ground. In other words, at the time T0 the first and second sensors (e.g., 304, 306, respectively) capture the portions of the images 504, 506, respectively, which correspond to different parts of the ground. Nevertheless, the first and second sensors are sufficiently close to one another and are moving at the same time as one another relative to the ground such that a majority of the first and second images will correspond to the same portion of the ground, just captured at slightly different times with slightly different satellite viewing angles. For example, at a time T1 the first sensor (e.g., 304) images the portion of ground P (labeled 518), which same portion of ground P (labeled 518) is imaged by the second sensor (e.g., 306) at a time T2, where T1<T2 (i.e., T2 occurs after T1). This concept is further explained with reference to FIG. 5B. The portion of ground P (labeled 518) is shown as being part of a larger geographic region 520 for which the first sensor (e.g., 304) is used to obtain the first image 504, and for which the second sensor (e.g., 306) is used to obtain the second image 506. Associated with each of the first and second images 504, 506 is respective image data (e.g., pixels). More specifically, associated with the first image 504 is first image data that includes first image information about the geographic region 520, and associated with the second image 506 is second image data that includes second image information about the geographic region 520. For example, the first image information about the geographic region 520 (which is included in the first image data) can include B, G, R, and N1 band values for each pixel of N×M pixels included in the first image 504, and the second image information about the geographic region 520 (which is included in second image data) can include C, Y, RE, and N2 band values for each pixel of N×M pixels included in the second image 506.

FIG. 5B shows the satellite 100 (T1), which is the satellite 100 at the time T1, and the satellite 100 (T2), which is the satellite 100 at the time T2. The dashed line labeled 514 (T1) is used to show which portion of the ground the first sensor (e.g., 304) of the satellite is imaging at the time T1, and the dotted line labeled 516 (T1) is used to show which portion of the ground the second sensor (e.g., 306) of the satellite is imaging at the time T1. Notice that at the time T1, the first sensor (e.g., 304) is imaging the portion of ground P (labeled 518), and that it is not until the time T2 (where T1<T2) that the second sensor (e.g., 306) is imaging the portion of the ground P (labeled 518). Certain embodiments of the present technology take advantage of this arrangement to detect moving objects. For example, since the first and second sensors image the same portion of the ground at different times, if a feature is moving at the portion of the ground P (labeled 518), then the moving feature will appear at different places in the image data captured by the first and second sensors.

As discussed above, in one embodiment the MS1 sensor 304 and the MS2 sensor 306 each capture image data for one or more bands. For example, FIG. 5A shows that MS1 sensor 304 captures first image 504 in a first wavelength band and MS2 sensor 306 captures second image 506 in a second wavelength band. PAN sensor 307 may also capture a third image in a third wavelength band (not shown). These images are aligned geographically and then have their edges trimmed, so that they match and form nine VNIR bands of a multispectral image.

Figure 6A:
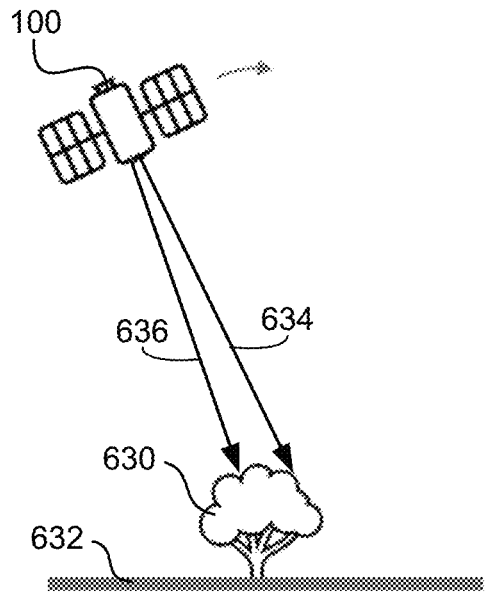
FIGS. 6A-D illustrate pixel information collected at two different points in time.
Figure 6B:
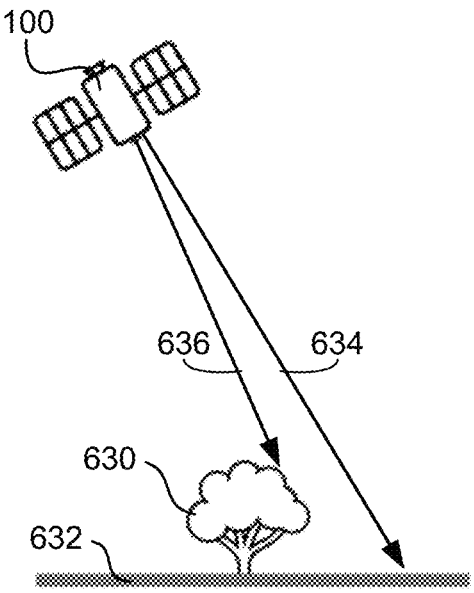

In some examples of the present technology, differences between images generated by different sensors in a sensor assembly may be used to estimate velocity of moving objects. FIGS. 6A-B illustrate an example of satellite 100 with respect to a stationary object, a tree 630, which is on Earth's surface 632, while FIG. 6C-D illustrate an example of satellite 100 with respect to a moving object, car 640 (moving left to right in this view), on Earth's surface 632 (e.g., on portion of ground 518).

In FIG. 6A, the line 634 shows what the first sensor (e.g., sensor 304) of satellite 100 is imaging at a first time T1 (imaging the edge of tree 630), and the line 636 shows what the second sensor (e.g., sensor 306) of satellite 100 is imaging at the first time T1. FIG. 6B shows satellite 100 at a second time T2 (e.g., T2=T1+Δt), subsequent to the first time, when satellite 100 has moved with respect to Earth and the fields of view of the sensors of satellite 100 have moved accordingly. At time T2, the line 636 shows that the second sensor is imaging at the edge of tree 630, while the line 634 shows that first sensor is imaging to the right of tree 630. The time difference between two sensors imaging the same location (e.g., time Δt) may be relatively short (e.g., less than a second) and may depend on the geometry of the sensor assembly, characteristics of the optical system used, satellite velocity, angle of view, and/or other factors.

Figure 6C:
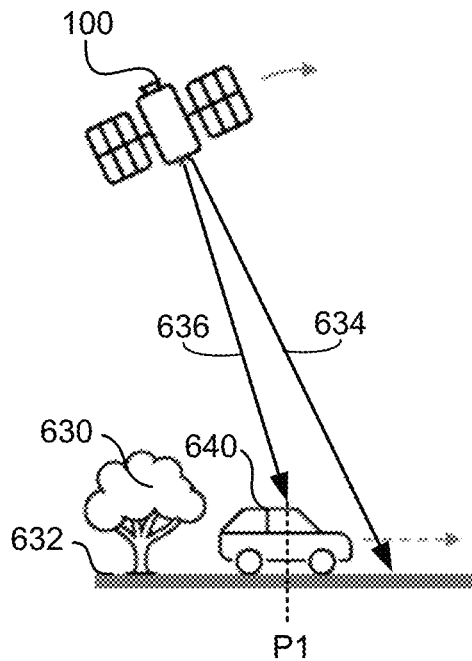
Figure 6D:
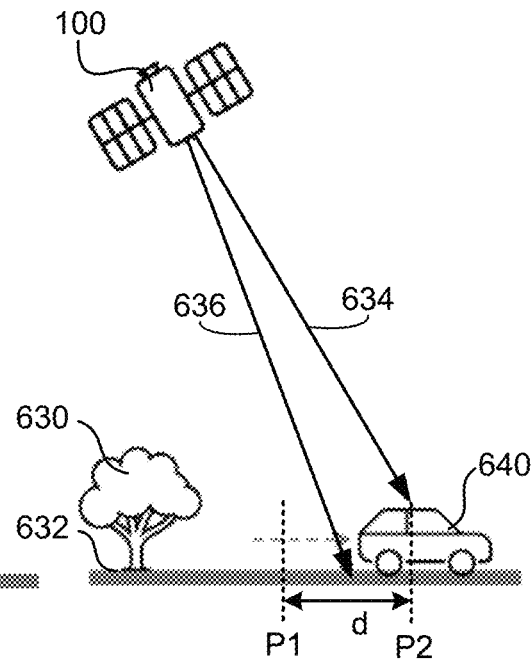

In FIG. 6C, line 636 shows that at a first time T1 the first sensor of satellite 100 is imaging car a 640 (or a point on car 640) while the second sensor is imaging to the right of car 640. FIG. 6D shows satellite 100 at a second time T2 (e.g., T2=T1+Δt), subsequent to the first time, when car 640 has moved with respect to Earth's surface 632 (away from tree 630), satellite 100 has moved with respect to Earth's surface 632, and the fields of view of the sensors of satellite 100 have moved accordingly. Line 634 shows that at time T2 the second sensor is imaging car 640 (or a point on car 640) while the first sensor is imaging to the left of car 640 (e.g., where second sensor was imaging at time T1). When images from first and second sensors are aligned to form a combined image, for example, by bringing stationary background features (e.g., tree 630) into alignment, moving objects (e.g., car 640) may show different locations in different images. For example, while a point on car 640 is at a first position, P1, at T1, the same point on car 640 is at a second position, P2, at time T2. The displacement, d, between P1 and P2 may be obtained from the two images (e.g., counting the number of pixels and multiplying by the pixel edge length, also known as "pixel spacing," "pixel size" or "pixel scale"). Dividing the displacement, d, by the time between images, Δt, gives an estimation of the speed of car 640 (e.g., speed=d/Δt, or speed=pixel shift*pixel scale/time difference). In some cases, stationary background features such as tree 630, portions of Earth's surface 632, buildings, and other stationary objects may not precisely coincide when images are aligned and may thus appear to have some non-zero velocity.

Figure 7A:
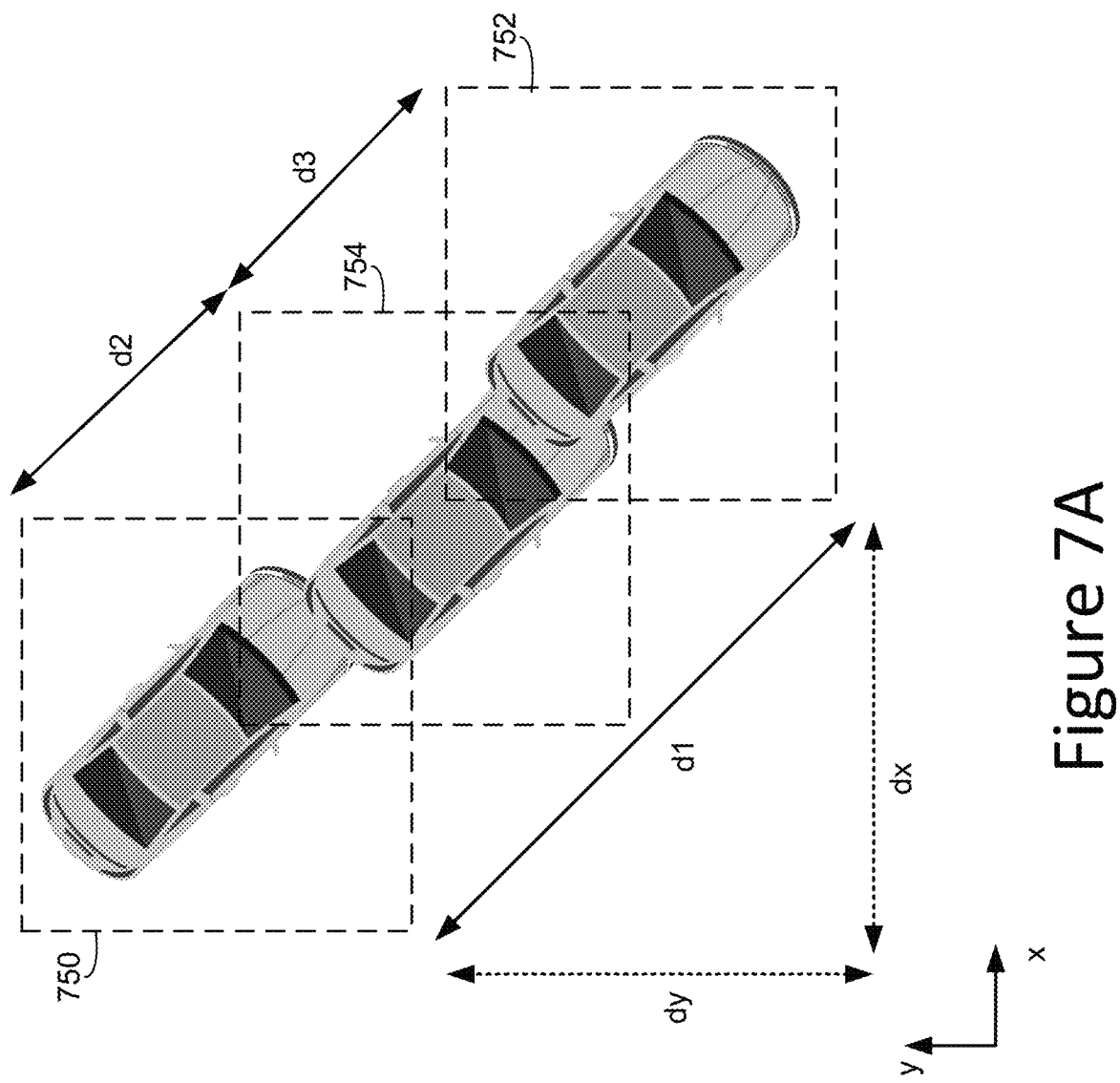
FIGS. 7A-B illustrate estimation of velocity from two or more images.

FIG. 7A illustrates an example of how velocity (speed and direction) may be obtained from images generated by a satellite sensor assembly (e.g., sensor assembly 302). Three images of a car (e.g., car 640) are shown including a first image 750 generated by first generated by a first sensor (e.g., MS1 sensor 304), a second image 752 generated by a second sensor (e.g., MS2 sensor 306) and a third image 754 generated by a third sensor (e.g., PAN sensor 307). For example, when image data from sensors 304, 306, 307 are aligned, car 640 may appear in the three locations shown, corresponding to the three sensors. Position changes between these images, including, for example, a first position change, displacement d1, between the first image 750 and second image 752, a second position change, displacement d2, between the first image 750 and the third image 754, and/or a third position change, displacement d3, between the third image 754 and the second image 752 may be found (e.g., by counting pixels or otherwise). The time differences between sensors (e.g., Δt) is generally known, or can be found, so that that the velocity of car 640 may be found from any one or more position change(s) between images from different sensors, e.g., any one or more of displacements d1, d2, d3. For example, d1 (MS1 to MS2) may be used because it is the longest displacement and so may have the smallest error. Alternatively, or additionally, d2 (PAN to MS1) or d3 (PAN to MS2) may be used. Speeds may be obtained from two or more of displacements d1, d2, d3, and may be combined (e.g., by averaging, weighted averaging, or otherwise). Heading (direction of movement) may be obtained from the x and y components of the displacements shown. For example, heading=$\tan^{-1}$ (dx/dy), where dx is the component of displacement d1 along the x direction and dy is the component of displacement d1 along the y direction.

In an example, machine learning is used to identify moving objects such as car 640. For example, a machine learning system may be trained using satellite images of cars so that it can recognize cars (or other ground motor vehicles). Machine learning may be applied to other moving objects including trains, ships, military vehicles, and aircraft. In an example, in order to reduce the search area of an image when looking for cars or other moving objects (e.g., using a system trained by machine learning), moving objects may be identified initially by looking for motion across the whole image and generating a mask reflecting areas with movement. Then, an application trained by machine learning may be applied to the areas defined by the mask to identify cars trains, ships, military vehicles, aircraft, and/or other moving objects of interest (e.g., first identifying one or more areas where motion occurs and then applying the machine learning object detection model to only the one or more areas identified to limit the search to a smaller total area). This may avoid searching large areas that do not have moving objects. In an example, a PAN band image (e.g., image from third sensor 307) is initially searched for areas of movement. Then, the identified areas are searched for specific moving object(s) (e.g., cars) using an artificial intelligence system (e.g., trained using machine learning). A PAN image, (the term "PAN image" is used to include a raw PAN image from a PAN sensor and PAN images that are sharpened, enhanced, or otherwise modified) may have higher resolution and may allow more reliable recognition than other images. Images other than PAN images may be searched using machine learning. For example, a PAN sharpened image may be used. A PAN sharpened is an image with multiple bands (e.g., an MS image that is sharpened using a corresponding PAN image). The result is a multi-spectral image that has the same resolution as PAN.

Once the image of a car is recognized (e.g., using machine learning) in a PAN image (e.g., image 754 from PAN sensor 307), the area nearby in corresponding images from other sensors (e.g., from a first sensor, MS1 sensor 304, and a second sensor, MS2 sensor 306) may be searched for a match (e.g., by looking for a pattern in corresponding images that is similar to a pattern recognized as a car). In an example, the likely direction of travel may be estimated from the orientation of car 640 (or other moving object) in PAN image 754. For example, cars generally move forward, so that recognizing the orientation of a car in a first image (e.g., image 754) may provide high-probability areas to search for the car in additional images. This may provide efficient searching of images from additional sensors once a car (or other moving object) is identified, and its orientation obtained from a first image.

Figure 7B:
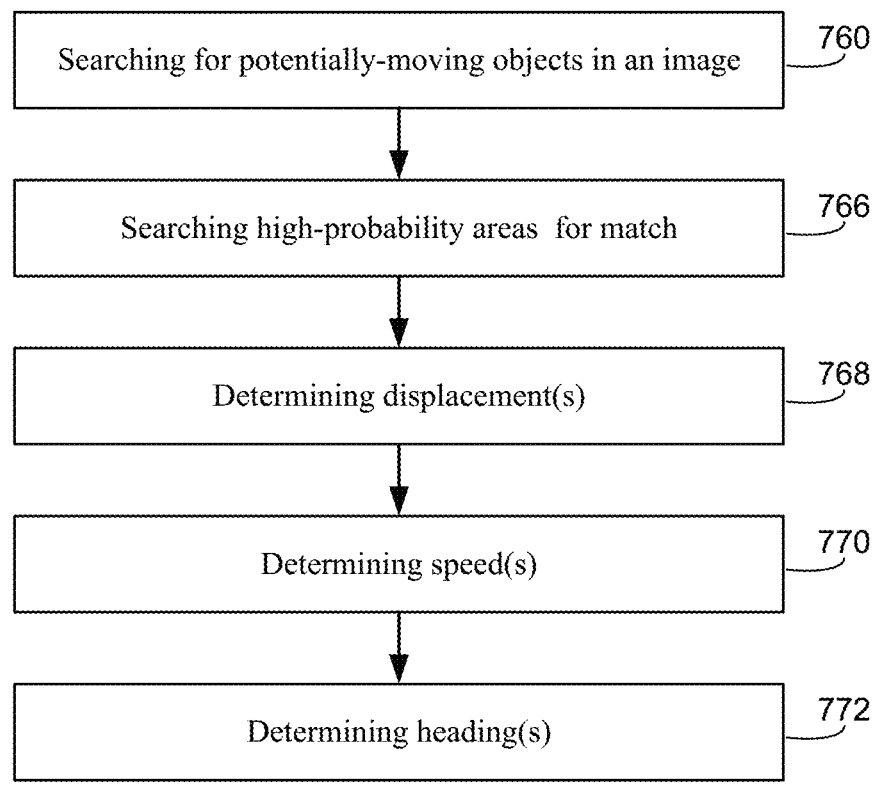

FIG. 7B is a flowchart illustrating a method of obtaining velocities of moving objects from images (e.g., images from satellite 100). The method includes searching for potentially-moving objects in an image 760, searching high-probability areas for a match 766 (e.g., searching for the same object in nearby areas of images from other bands along the likely direction of travel), determining shift distances or displacement(s) 768 (e.g., displacements d1, d2, d3), determining speed(s) 770 (e.g., dividing displacements by known time differences between sensors), and determining headings (e.g., from x and y components of displacements d1, d2, d3).

Figure 8A:
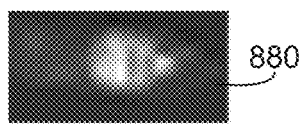
FIGS. 8A-D illustrate matching of a template with a location in an image.
Figure 8B:
Figure 8C:
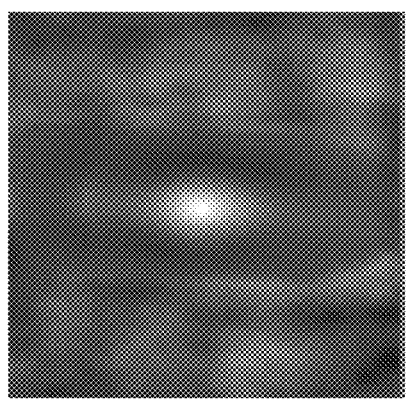

Searching to obtain a match (e.g., step 766) may include extracting a template of a moving image from a first image (e.g., image generated in a first frequency band, such as PAN band) and using the template to find a location in a second image (e.g., image generated in a second frequency band, such as an MS band) that matches (e.g., where a high correlation is found between patterns of pixels). FIG. 8A shows an example of a template 880 (from an image of a ship at sea) extracted from a first image generated in a first frequency band (e.g., PAN band). Template 880 may be used to search for a match in one or more images generated in other frequency bands (e.g., MS1 and/or MS2). FIG. 8B shows an example of an image 882 from a second frequency band that may be searched using template 880 of FIG. 8A. Image 882 may be upsampled (e.g., by using interpolation to generate a higher resolution image than the original image) so that the resolution of image 882 is the same, or close to the resolution of template 880. A likely match appears in the center of FIG. 8B. FIG. 8C shows the matching result, indicating high correlation between template 880 and a location at the center of image 882.

In one example, matching includes determining correlation between a template and multiple different locations of an image and choosing the location with the highest correlation. For example, template 880 may be moved from location to location, one pixel at a time, to find an optimum location. This may provide matching with nearest-pixel accuracy. In an example of the present technology, matching may be achieved with sub-pixel accuracy (smaller than one-pixel accuracy).

Figure 8D:
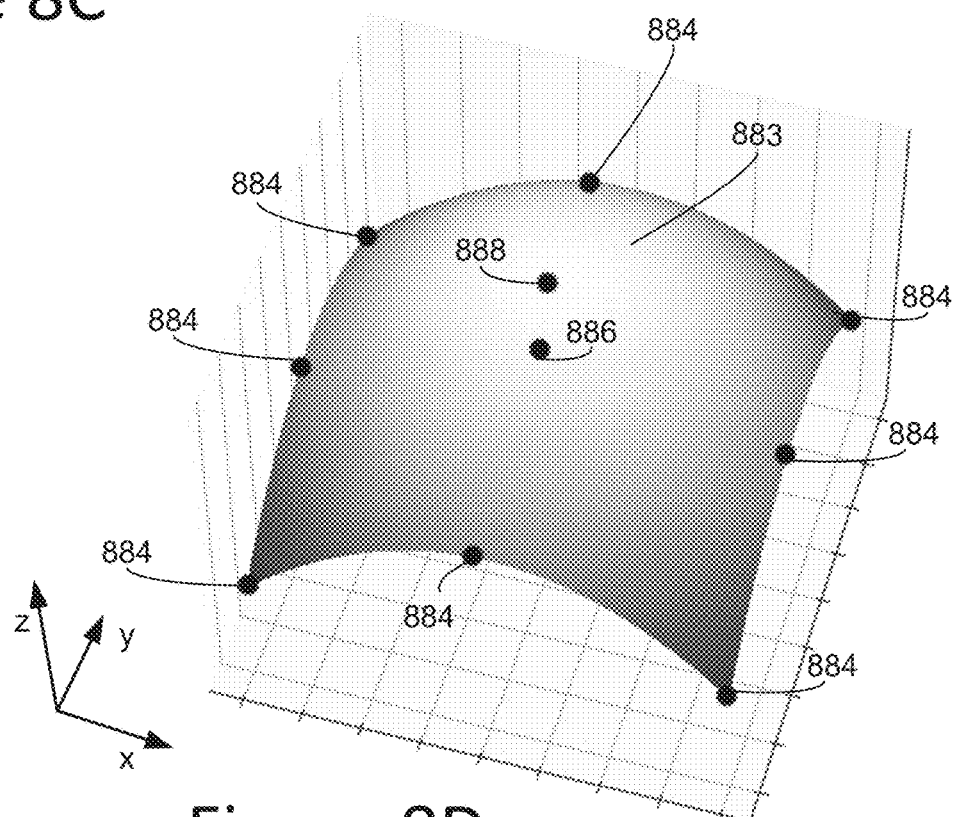

FIG. 8D shows an example of a correlation surface 883 that is fitted to nine data points. The x and y directions correspond to displacement of template 880 in x and y directions along the plane of image 882 and the z direction shows correlation values of template 880 at each location (e.g., a measure of how well pixels of template 880 correlate with pixels of image 882). A central data point 886 corresponds to correlation of template 880 at a first (central) location in image 882 and data points 884 correspond to correlation at locations in image 882 that are one pixel right/left (along x direction) and/or up/down (along y direction) about the central location. Correlation surfaces may be generated from any number of data points (e.g., more or less than nine) in any arrangement. For one-pixel accuracy, central location 886 may be selected because it shows better correlation than any other location (e.g., higher correlation value than any of data points 884). However, correlation surface 883 shows highest correlation (local maximum) at a maximum correlation location 888 on correlation surface 883 that is offset from central location 886. For sub-pixel matching, maximum correlation location 888 may be selected as a matching location and any displacements between template 880 and a matching location (e.g., displacements d1, d2, d3, or similar) may be based on maximum correlation location 888 and not central location 886.

In order to accurately estimate velocity of a moving object from two or more images, the images may be aligned. The accuracy of such alignment (registration) may affect any estimated velocities. For example, misregistration (misalignment) of images may cause stationary objects to appear to move between images and may affect any velocities estimated from changes in location between images. While misalignment of images is one source of misregistration, even when images are aligned to a standard, some misalignments below the level of the imagery standard used may occur (e.g., local misregistration may occur even where there is no image-wide or global misregistration). Misregistration may occur in different ways and may be caused by different factors. In some cases, local misregistration may occur in one area of an image and different misregistration (or no misregistration) may occur in another area of an image. While a small amount of misregistration in one or more areas of an image may not be significant for image quality, even misregistration of less than a pixel in one or more locations of an image may be significant for purposes of velocity estimation. Aspects of the present technology are directed to reducing or eliminating effects of misregistration on velocity estimation.

Figure 9:
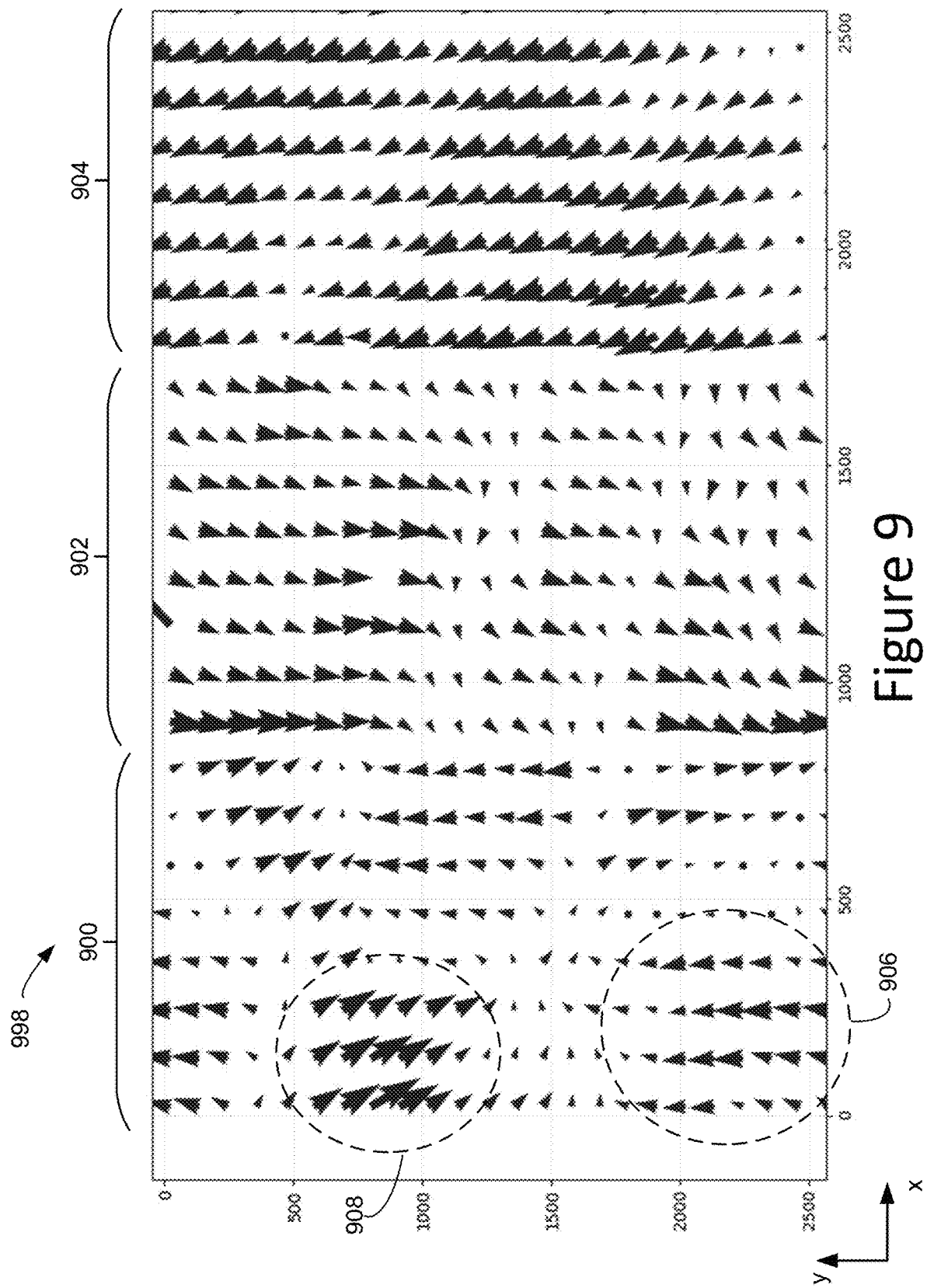
FIG. 9 illustrates an example of misregistration.

FIG. 9 shows an area 998 including portions of three stripes 900, 902, 904 produced by three DCAs. FIG. 9 illustrates different misregistration between locations of individual stripes (in addition to stripe-to-stripe or DCA-to-DCA differences). For example, stripe 900 includes first area 906 in which apparent movement is upwards (positive y direction) and second area 908 in which apparent movement is downwards (negative y direction) and to the right (positive x direction). In this example, apparent movement caused by misregistration is up to about 0.79 pixels in area 908. Misregistration may be caused by a number of factors including, but not limited to, different DCA mounting locations (e.g., along focal plane of optical system), different DCA mounting geometry, variation between DCAs, variation between different areas of individual DCAs, effects of optical systems, atmospheric effects, effects of terrestrial features, background noise, and other factors.

Figure 10A:
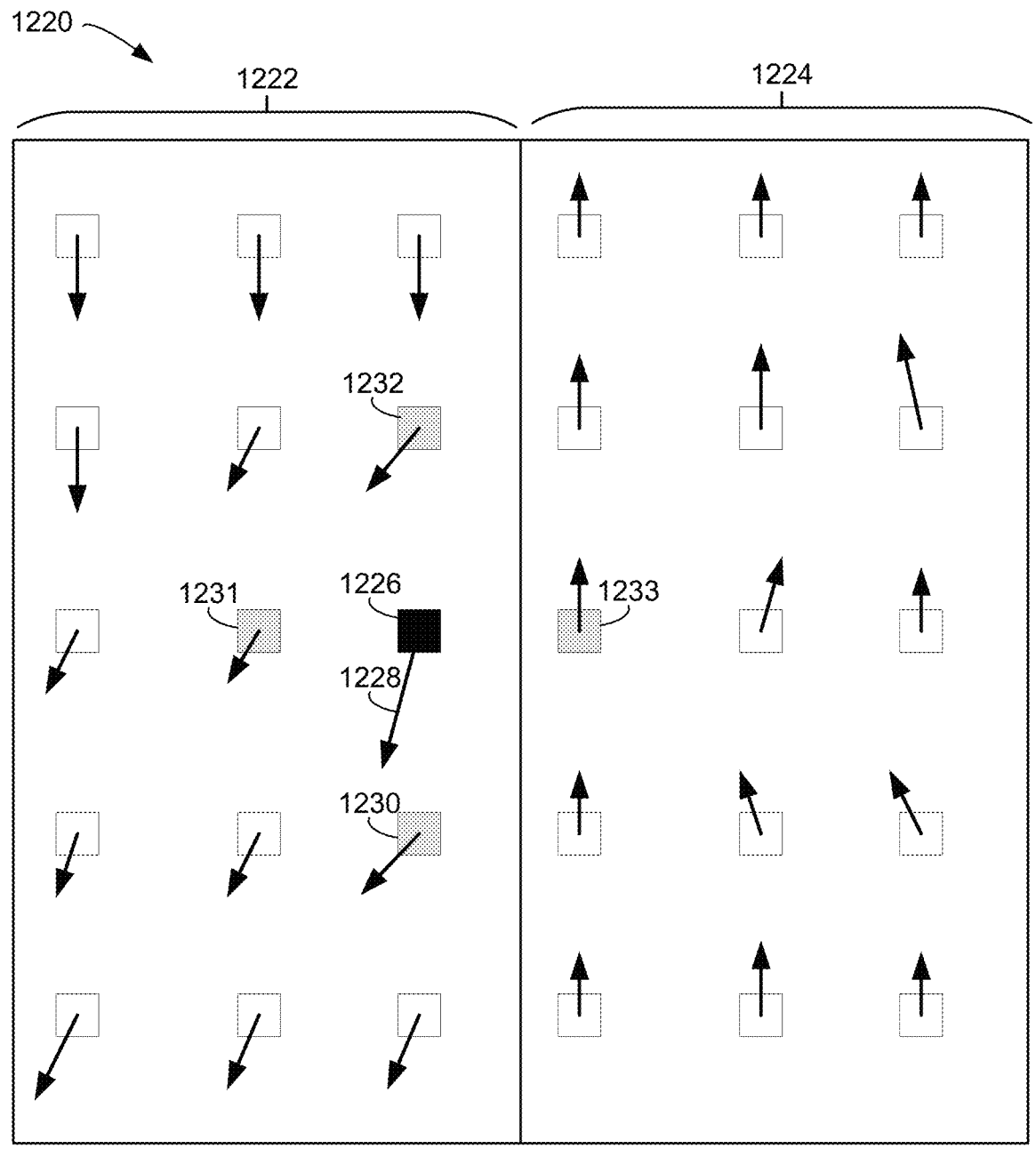
FIGS. 10A-B illustrate obtaining and using a misregistration value to correct a raw velocity.

FIG. 10A shows an example of an image 1220 that includes portions of two stripes 1222 and 1224, each corresponding to a different DCA. A moving object is detected at a first location 1226. The raw (uncorrected) velocity of the moving object is shown by arrow 1228. Apparent velocities of assumed stationary background features (e.g., portions of the ground, buildings, trees) at locations close to location 1226 are also shown by corresponding arrows, for example, at locations 1230, 1231, 1232, and 1233 located respectively below (negative y direction), to the left (negative x direction), above (positive y direction) and to the right (positive x direction) from location 1226. These locations correspond to assumed stationary objects (e.g., portions of Earth's surface) so that their apparent velocities may be caused by misregistration. A misregistration value may be obtained from any one or more such locations and may be used to correct the raw velocity of the moving object at location 1226. For example, misregistration values from all locations shown in FIG. 10A may be combined (e.g., averaged) and used. Misregistration values from selected locations (e.g., adjacent locations 1230-1233) may be combined and used. Any other combination of locations may be used. Locations for misregistration calculation may be arranged in a grid as shown, or otherwise.

FIG. 10A shows location 1226 is in stripe 1222 and is close to stripe 1224, which has different local misregistration to stripe 1222 (e.g., apparent velocity in stripe 1222 generally down to the left—negative x and y directions, while apparent velocity in stripe 1224 is generally up—positive y direction). In an example, locations in stripe 1224 are not used when calculating misregistration for correcting velocity of the moving object at location 1226 (e.g., locations such as location 1233 in stripe 1224 are excluded). Thus, misregistration may be estimated from locations 1230-1232, excluding location 1233 (and any other locations in stripe 1224). Selecting locations for misregistration calculation may include identifying locations that are captured by a plurality of Detector Chip Assemblies (DCAs) and selecting only locations that are captured by a DCA that captures the moving object (e.g., selecting only from stripe 1222). Selecting locations for misregistration calculation may include selecting at least three locations (e.g., locations 1230-1232) from four or more locations located close to the moving object (e.g., locations 1230-1233). The at least three locations may be captured by the DCA that captures the moving object (same stripe 1222) and excluding at least one of the four or more locations that is captured by an adjacent DCA of the plurality of DCAs (e.g., excluding location 1233). In an example, a median misregistration is obtained from the misregistrations at locations 1230-1233. This may effectively exclude a location such as location 1233 or other outlier (e.g., outlier caused by terrestrial feature or moving object).

Selecting locations for misregistration calculation may include selecting multiple nearby locations and excluding any locations that are not in the same stripe (not captured by the same DCA). Different stripes may be apparent from a pattern of misregistration, may be known from mapping of location in the image to DCAs, or otherwise. In addition to excluding locations in other stripes, locations that may be affected by terrestrial features (e.g., slopes, bodies of water) may be excluded. Locations that show misregistration that is very different to neighboring locations may be excluded, e.g., by using a median value of misregistration values from multiple locations.

Figure 10B:
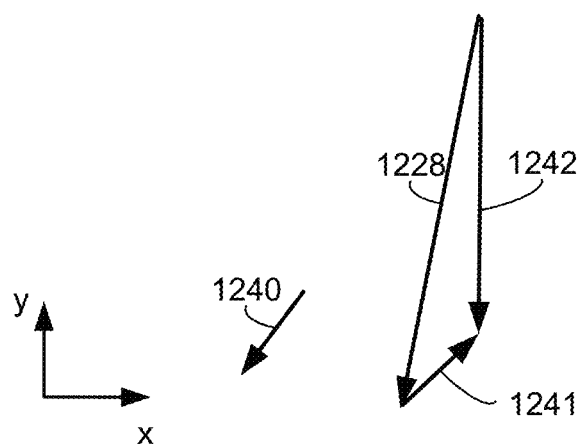

A misregistration value (e.g., average from locations 1230-1232) may be used to correct a raw velocity value of a moving object (e.g., as illustrated by arrow 1228) by subtracting the misregistration value (combined apparent velocity of nearby locations) to obtain a more accurate velocity (corrected velocity). Vector subtraction may correct both speed and direction as illustrated in FIG. 10B, which includes the misregistration value obtained from nearby locations (represented by arrow 1240), subtracted (represented by arrow 1241) from the raw velocity (illustrated by arrow 1228) to obtain corrected velocity 1242.

Figure 11:
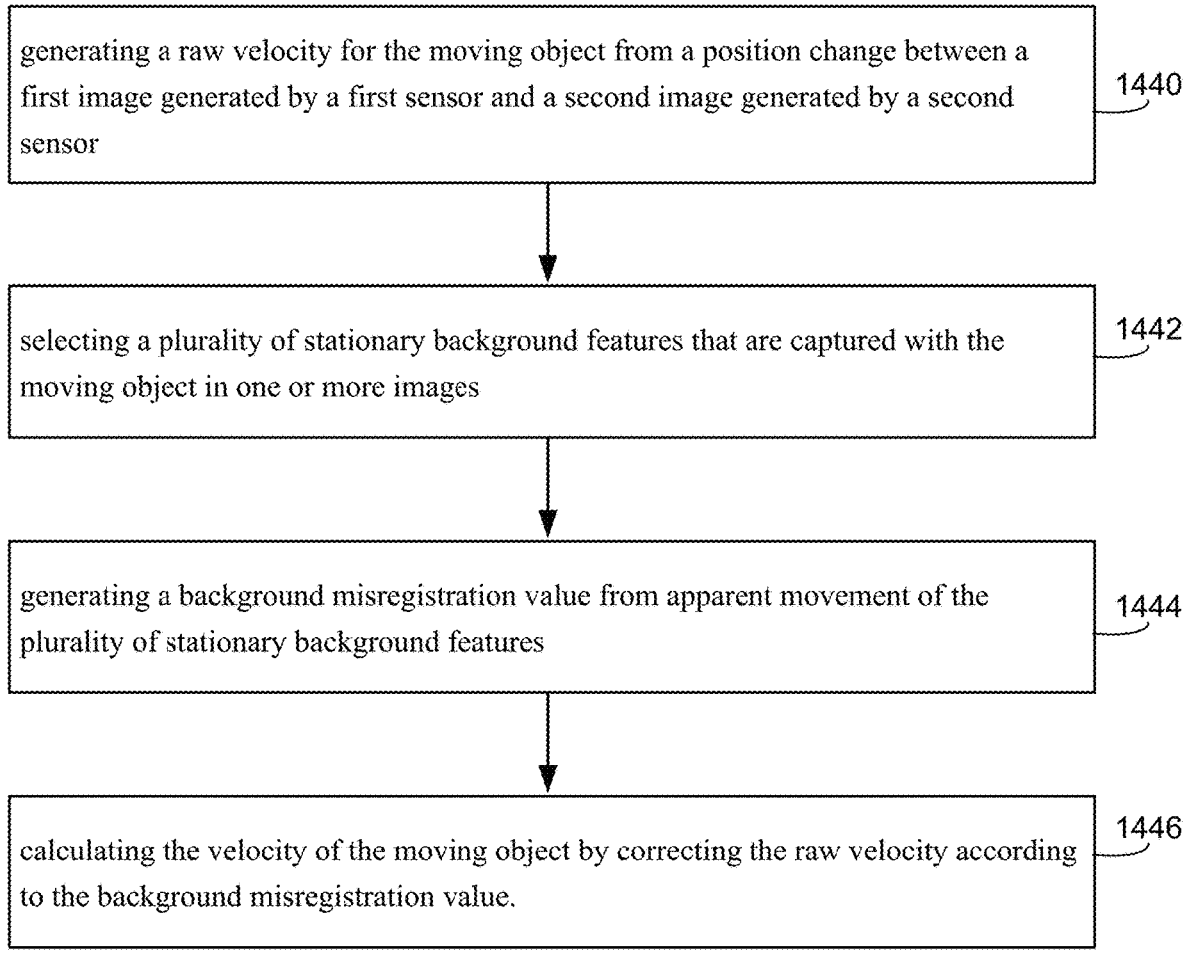
FIG. 11 illustrates an example of a method of estimating velocity.

FIG. 11 shows an example of a method for estimating the velocity of a moving object that includes generating a raw velocity for the moving object from a position change between a first image generated by a first sensor and a second image generated by a second sensor 1440, selecting a plurality of stationary background features that are captured with the moving object in one or more images 1442, and generating a background misregistration value from apparent movement of the plurality of stationary background features 1444. For example, stationary background features (e.g., portions of the ground) close to a moving object may be selected and their apparent velocities used to generate a local background misregistration value. The method further includes calculating the velocity of the moving object by correcting the raw velocity according to the background misregistration value 1446. For example, local background misregistration may be subtracted from raw velocity as shown in FIG. 10B to obtain corrected velocity.

Aspects of the present technology may be implemented by appropriate circuits. For example, the methods of FIGS. 7B and 11 and/or other methods described herein may be implemented by one or more circuits of image processing system 236 in data center 232 that are configured to perform the method steps (e.g., using circuits described in FIG. 2A, or otherwise). Data storage system 238 may include a non-transitory processor readable storage device (e.g., non-volatile memory such as flash memory, hard drive, solid state drive, optical data storage device, or other storage device) having processor readable code embodied on the processor readable storage device, the processor readable code for programming one or more processors (e.g., processors in imaging processing system 236) to perform any of the method steps described above (e.g., as shown in FIGS. 7B and 11).

One embodiment includes a method for estimating velocity of a moving object, including generating a raw velocity for the moving object from a position change between a first image generated by a first sensor and a second image generated by a second sensor of a sensor assembly; selecting a plurality of stationary background features that are captured with the moving object in one or more images; generating a background misregistration value from apparent movement of the plurality of stationary background features; and calculating the velocity of the moving object by correcting the raw velocity according to the background misregistration value.

The method may further include detecting the moving object by applying a machine learning object detection model. The machine learning object detection model may be trained to identify one or more of cars, trains, ships, military vehicles, and aircraft. The machine learning object detection model may be applied to an image from a panchromatic (PAN) band sensor; the first image may be generated by a first multispectral sensor; and the second image may be generated by a second multispectral sensor. Selecting the plurality of stationary background features may include identifying locations that are captured by a plurality of Detector Chip Assemblies (DCAs) and selecting only locations that are captured by a DCA that captures the moving object. Selecting the plurality of stationary background features may include selecting at least three locations from four or more locations located close to the moving object, the at least three locations captured by the DCA that captures the moving object; and excluding at least one of the four or more locations that is captured by an adjacent DCA of the plurality of DCAs. Obtaining the position change between the first image and the second image may include extracting a template of the moving object from the first image; obtaining correlation values for the template at a plurality of locations in the second image; finding a maximum correlation location; and using the maximum correlation location to calculate the position change. Finding the maximum correlation location may include fitting a surface to the correlation values and finding the maximum correlation location at an offset from one of the plurality of locations in the second image. Generating the raw velocity for the moving object may further include determining an additional position change between at least one of the first image or the second image and a third image generated by a third sensor; and calculating raw velocity from the position change and the additional position change.

One embodiment includes apparatus comprising one or more circuits configured to: generate a raw velocity for a moving object from a position change between a first image generated by a first sensor and a second image generated by a second sensor; select a plurality of stationary background features that are captured with the moving object in one or more images; generate a background misregistration value from apparent movement of the plurality of stationary background features; and calculate velocity of the moving object by correcting the raw velocity according to the background misregistration value.

The one or more circuits may be further configured to detect the moving object by applying a machine learning model. The one or more circuits may be further configured to apply the machine learning model to a panchromatic (PAN) band image. The one or more circuits may be further configured to select the plurality of stationary background features from images captured by a plurality of Detector Chip Assemblies (DCAs) by selecting only background features from a DCA that captures the moving object. The one or more circuits may be further configured to: extract a template of the moving object from the first image; obtain correlation values for the template at a plurality of locations in the second image; find a maximum correlation location; and use the maximum correlation location to calculate the position change. The one or more circuits may be further configured to find the maximum correlation location by fitting a surface to the correlation values and finding the maximum correlation location at an offset from one of the plurality of locations in the second image. The one or more circuits may be further configured to determine an additional position change between at least one of the first image or the second image and a third image generated by a third sensor and to calculate raw velocity from the position change and the additional position change.

One embodiment includes a non-transitory processor readable storage device having processor readable code embodied on the non-transitory processor readable storage device, the processor readable code for programming one or more processors to perform a method comprising: generating a raw velocity for a moving object from a position change between a first image generated by a first sensor and a second image generated by a second sensor; selecting a plurality of stationary background features that are captured with the moving object in one or more images; generating a background misregistration value from apparent movement of the plurality of stationary background features; and calculating velocity of the moving object by correcting the raw velocity according to the background misregistration value.

Selecting the plurality of stationary background features may include identifying stationary background features that are captured by a plurality of Detector Chip Assemblies (DCAs) and selecting only stationary background features that are captured by a DCA that captures the moving object. Obtaining the position change between the first image and the second image may include extracting a template of the moving object from the first image; obtaining correlation values for the template at a plurality of locations in the second image; finding a maximum correlation location; and using the maximum correlation location to calculate the position change.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A method for estimating velocity of a moving object, comprising:
   receiving, by an image processing system, a first image generated by a first sensor, which is specific to a first wavelength band, a second image generated by a second panchromatic sensor, which is specific to a panchromatic band, and a third image generated by a third sensor, which is specific to a third wavelength band; the first wavelength band being different than the third wavelength band;
   recognizing, by the image processing system, a moving object in the second image;
   generating, by the image processing system, based on the moving object recognized in the second image, a raw velocity for the moving object from a displacement between the first image and the third image;
   selecting, by the image processing system, a plurality of stationary background features that are captured with the moving object in the first image and/or the third second image based on locations of the plurality of the stationary background features relative to the moving object, wherein the plurality of stationary background features are non-moving features;
   generating, by the image processing system, a background misregistration value from apparent movement of selected ones of the plurality of stationary background features; and
   calculating, by the image processing system, the velocity of the moving object by correcting the raw velocity according to the background misregistration value.

2. The method of claim 1, wherein recognizing the moving object includes applying a machine learning object detection model to the second image.

3. The method of claim 2, wherein the machine learning object detection model is trained to identify one or more of cars, trains, ships, military vehicles, and aircraft.

4. The method of claim 2, wherein recognizing the moving object in the second images includes:
   identifying, by the image processing system, one or more areas of the second image where motion occurs; and
   applying, by the image processing system, the machine learning object detection model to only the one or more areas identified.

5. The method of claim 1, wherein selecting the plurality of stationary background features is based on the locations of the plurality of stationary background features being captured by one of the first sensor and/or the third sensor.

6. The method of claim 1, wherein obtaining the displacement between the first image and the third image includes:
   extracting, by the image processing system, a template of the moving object from the first image;
   obtaining, by the image processing system, correlation values for the template at a plurality of locations in the third image;
   finding, by the image processing system, a maximum correlation location; and
   using the maximum correlation location to calculate displacement.

7. The method of claim 6, wherein finding the maximum correlation location includes fitting a surface to the correlation values and finding the maximum correlation location at an offset from one of the plurality of locations in the second image.

8. The method of claim 1, wherein generating the raw velocity for the moving object further includes:
determining an additional displacement between at least one of the first image or the third image and a third image generated by a third sensor; and
calculating raw velocity from the displacement and the additional displacement.

9. A computing system comprising:
one or more processors of an image processing system; and
a non-transitory processor readable medium, which includes processor executable code, which when executed by the one or more processors, causes the one or more processors to:
receive a first image generated by a first sensor, which is specific to a first wavelength band, a second image generated by a second panchromatic sensor, which is specific to a panchromatic band, and a third image generated by a third sensor, which is specific to a third wavelength band; the first wavelength band being different than the third wavelength band;
recognize a moving object in the second image;
generate, based on the moving object recognized in the second image, a raw velocity for the moving object from a position change between the first image and the third image;
select a plurality of stationary background features that are captured with the moving object in the first image and/or the third image based on locations of the plurality of the stationary background features relative to the moving object, wherein the plurality of stationary background features are non-moving features;
generate a background misregistration value from apparent movement of the plurality of stationary background features; and
calculate velocity of the moving object by correcting the raw velocity according to the background misregistration value.

10. The computing system of claim 9, wherein the processor executable code, when executed by the one or more processors, causes the one or more processors to recognize the moving object by applying a machine learning model; and
wherein the second image has a higher resolution, relative to the first image and the third image.

11. The computing system of claim 9, wherein the processor executable code, when executed by the one or more processors, further causes the one or mor processors, to determine orientation of the moving object and use the orientation to estimate likely direction of travel of the moving object.

12. The computing system of claim 9, wherein the processor executable code, when executed by the one or more processors, further causes the one or mor processors, to:
extract a template of the moving object from the first image;
obtain correlation values for the template at a plurality of locations in the third image;
find a maximum correlation location; and
use the maximum correlation location to calculate the position change.

13. The computing system of claim 12, wherein the processor executable code, when executed by the one or more processors, further causes the one or mor processors, to find the maximum correlation location by fitting a surface to the correlation values and finding the maximum correlation location at an offset from one of the plurality of locations in the second image.

14. The computing system of claim 9, further comprising:
a satellite including a sensor assembly in which the second panchromatic sensor is disposed between the first sensor and the third sensor; and
a ground station configured to receive the first, second and third images from the one or more satellites and to send the images to the first, second, and third image processing system.

15. A non-transitory processor readable storage device having processor readable code embodied on the non-transitory processor readable storage device, the processor readable code for programming one or more processors to perform a method comprising:
receiving a first image generated by a first sensor, which is specific to a first wavelength band, a second image generated by a second panchromatic sensor, which is specific to a panchromatic band, and a third image generated by a third sensor, which is specific to a third wavelength band; the first wavelength band being different than the third wavelength band;
recognizing a moving object in the second image;
generating, based on the moving object recognized in the second image, a raw velocity for the moving object from a position change between the first image and the third image;
selecting a plurality of stationary background features that are captured with the moving object in the first image and/or the third image, based on locations of the plurality of the stationary background features relative to the moving object, wherein the plurality of stationary background features are non-moving features;
generating a background misregistration value from apparent movement of the plurality of stationary background features; and
calculating velocity of the moving object by correcting the raw velocity according to the background misregistration value.

16. The non-transitory processor readable storage device of claim 15, wherein selecting the plurality of stationary background features is based on the locations of the plurality of stationary background features being captured by one of the first sensor and/or the third sensor.

17. The non-transitory processor readable storage device of claim 15, wherein obtaining the position change between the first image and the third image includes: extracting a template of the moving object from the first image;
obtaining correlation values for the template at a plurality of locations in the third image;
finding a maximum correlation location; and
using the maximum correlation location to calculate the position change.

* * * * *